United States Patent
Ueba (10) Patent No.: US 8,245,085 B2
(45) Date of Patent: Aug. 14, 2012

(54) DUMP OUTPUT CONTROL APPARATUS AND DUMP OUTPUT CONTROL METHOD

(75) Inventor: Takuma Ueba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 12/785,743

(22) Filed: May 24, 2010

(65) Prior Publication Data

US 2010/0332914 A1 Dec. 30, 2010

(30) Foreign Application Priority Data

Jun. 25, 2009 (JP) ................................. 2009-150486

(51) Int. Cl.
*G06F 11/00* (2006.01)

(52) U.S. Cl. ................ 714/45; 714/10; 714/25; 714/37; 714/38.11; 707/642; 707/669

(58) Field of Classification Search .................... 714/10, 714/25, 27, 37, 38.11, 45; 707/642, 669
See application file for complete search history.

(56) References Cited

U.S. PATENT DOCUMENTS

| 6,898,736 | B2* | 5/2005 | Chatterjee et al. ............... 714/45 |
| 2004/0098642 | A1* | 5/2004 | Kaszycki et al. ............... 714/45 |
| 2005/0177764 | A1* | 8/2005 | Cassell et al. ..................... 714/5 |
| 2006/0156057 | A1* | 7/2006 | Babu .................................. 714/5 |
| 2009/0024820 | A1* | 1/2009 | Ponnuswamy ................. 714/45 |
| 2009/0216967 | A1* | 8/2009 | Sugawara ........................ 714/37 |
| 2010/0180156 | A1* | 7/2010 | Aranguren et al. ............. 714/37 |

FOREIGN PATENT DOCUMENTS

| JP | 61-221839 | 10/1986 |
| JP | 5-120088 | 5/1993 |
| JP | 2000-148544 | 5/2000 |

\* cited by examiner

*Primary Examiner* — Christopher McCarthy
*Assistant Examiner* — Joseph D Manoskey
(74) *Attorney, Agent, or Firm* — Staas & Halsey LLP (57) ABSTRACT

A dump output control apparatus includes a storage unit that stores output device information indicating an output device that is an output destination of dump information, a dump output device control unit that obtains the output device information stored in the storage unit and, determines a device as an output device for outputting the dump information thereto based on the obtained output device information, and a dump output unit that outputs the dump information to the determined output device.

9 Claims, 6 Drawing Sheets

| PRIORITY | OUTPUT DEVICE | DUMP TARGET INFORMATION | DUMP FORMAT |
|---|---|---|---|
| 1 | Compact Flash | Full | BINARY |
| 2 | REMOTE MACHINE HDD | Full | ELF Core |
| 3 | NOR/NAND Flash | cpu REGISTER | HEXADECIMAL |

FIG. 3B

| PRIORITY | OUTPUT DEVICE | DUMP TARGET INFORMATION | DUMP FORMAT |
|---|---|---|---|
| 1 | Compact Flash | - | ELF Core |
| 2 | REMOTE MACHINE HDD | - | - |
| 3 | NOR/NAND Flash | - | - |

DUMP OUTPUT CONTROL APPARATUS AND DUMP OUTPUT CONTROL METHOD

CROSS-REFERENCE TO RELATED APPLICATION

This application is based upon and claims the benefit of priority of the prior Japanese Patent Application No. 2009-150486, filed on Jun. 25, 2009, the entire contents of which are incorporated herein by reference.

FIELD

Embodiments discussed herein relate to a dump output control apparatus that performs a dump process when a hardware failure or a software failure occurs.

BACKGROUND

In the information processing field, when a failure occurs in hardware or a failure occurs in software within a kernel space of an OS (operating system), the OS determines that it is impossible to continue the processing and performs a panic process, in order to shorten a failure recovery time. In order to identify the factor of the failure, register information corresponds to a CPU (central processing unit) at occurrence of the panic and information stored in a memory are outputted (dumped) to a hard disk device within an information processor, or to various storage devices of a remote machine by means of network communication.

The dump function can be performed by an OS in which a panic occurs, or by an OS dedicated for a dump process activated when an OS panics.

Further, Japanese Laid-open Patent Application Publication Nos. 2000-148544, 61-221839, and 5-120088 disclose related arts.

In the existing arts, a dump output destination device and a dump procedure are limited. Therefore, a user cannot optionally select a dump output destination device.

SUMMARY

According to embodiments of the invention, a dump output control apparatus includes a storage unit that stores output device information indicating an output device that is an output destination of dump information, a dump output device control unit that obtains the output device information stored in the storage unit and, determines a device as an output device for outputting the dump information thereto based on the obtained output device information, and a dump output unit that outputs the dump information to the determined output device.

DESCRIPTION OF EMBODIMENTS

Figure 1A:
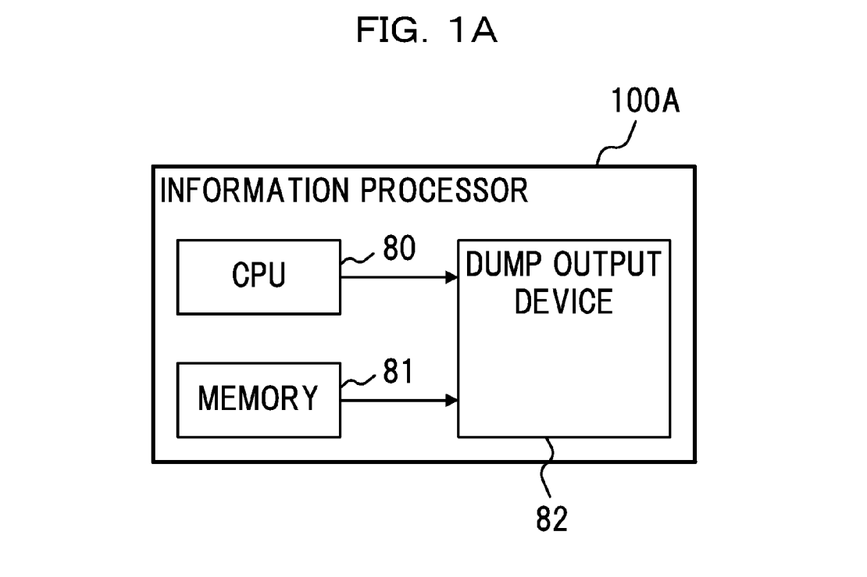
FIGS. 1A and 1B illustrate examples of a hardware configuration of an information processor according to an embodiment of the invention.
Figure 1B:
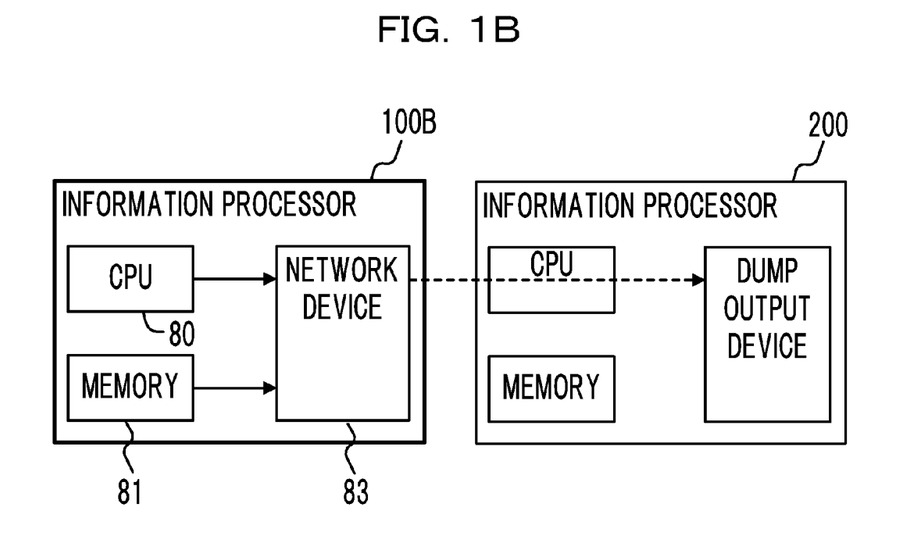

FIGS. 1A and 1B illustrate a hardware configuration of an information processor according to an embodiment of the invention. FIG. 1A illustrates an example where a dump output device, which is a device for storing data subjected to a dump process, is provided within the information processor. FIG. 1B illustrates an example where a dump output device is provided outside the information processor.

In an information processor 100A illustrated in FIG. 1A, information stored in various registers and information stored in each address of a memory 81 (hereinafter, referred to as "dump information") are outputted from a CPU 80 and the memory 81 to a dump output device 82, when a panic occurs. The dump output device is a nonvolatile storing device, such as a magnetic disc device or a flash memory.

In the example illustrated in FIG. 1B, dump information is outputted from an information processor 100B to the dump output device within an information processor 200 by performing network communication using the TCP/IP protocol for example. In this case, the information processor 100B outputs the dump information to the dump output device within the information processor 200 via a network device 83.

Figure 2:
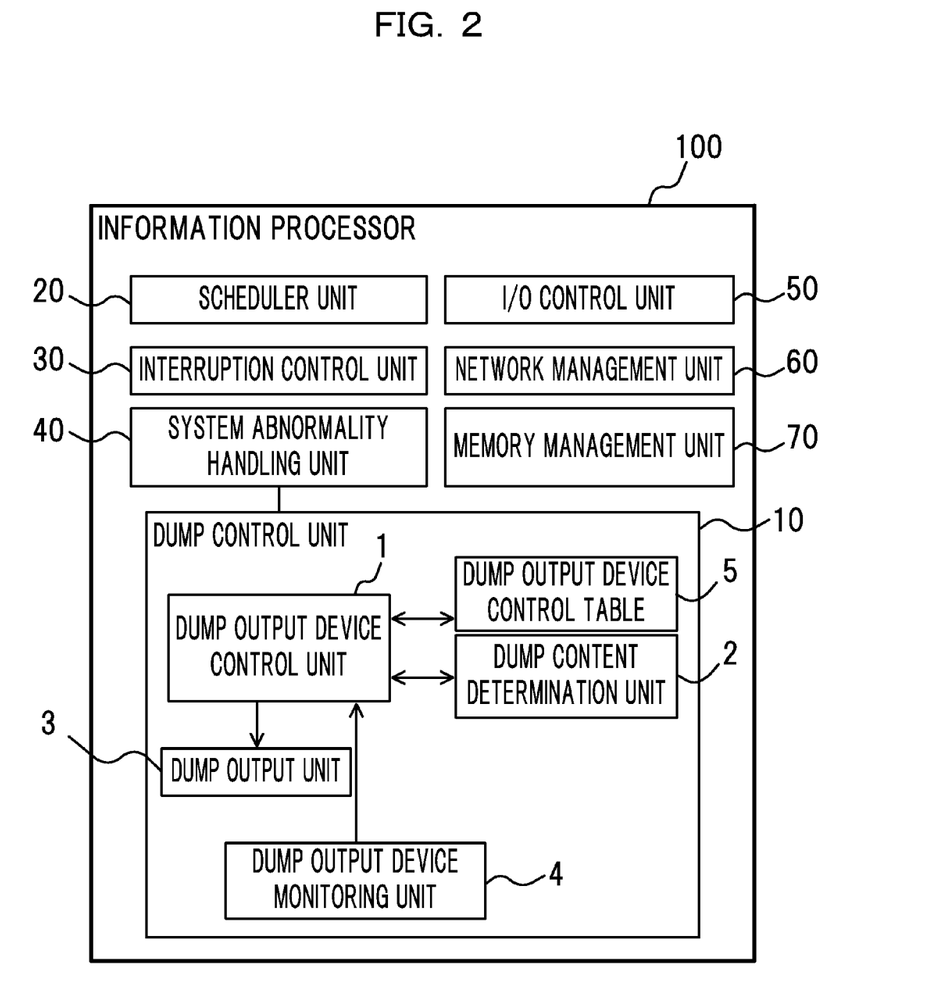
FIG. 2 illustrates an example of a functional block diagram of the information processor according to the embodiment.

FIG. 2 illustrates an example of a functional block diagram of the information processor according to the embodiment. An information processor 100 includes a scheduler unit 20, an interruption control unit 30, a system abnormality handling unit 40, an I/O control unit 50, a network management unit 60 and a memory management unit 70. Functions of each of these units are implemented by an operating system (hereinafter, referred to as "OS") cooperating with hardware such as the CPU 80 and the memory 81.

The scheduler unit 20 manages an execution sequence in which the CPU 80 is caused to execute tasks based on priority order of assigned tasks. The interruption control unit 30 controls an interruption process for interrupting a task currently executed by the CPU 80 and causing the CPU 80 to perform the other process. The system abnormality handling unit 40 monitors a state of the hardware and the OS within the information processor 100, and causes a dump control unit 10 to perform a dump output control process when either of these monitored targets comes into an abnormal state. The dump control unit 10 will be described later.

The I/O control unit 50 controls an interface that performs input of data to and output of data from the external of the information processor 100, and controls input and output of data on a bus that performs data communication within the information processor 100. The network management unit 60 controls communication with an apparatus connected via a network, by performing control of the network device 83, or the like. The memory management unit 70 causes the memory 81 to maintain a state of data stored therein, and checks consistency of data to be stored in the memory 81.

The information processor 100 in FIG. 2 includes the dump control unit 10. The system abnormality handling unit 40 calls the dump control unit 10 when an abnormality occurs in the hardware or software within the information processor 100. The dump control unit 10 may be implemented by the OS which implements each function, such as the scheduler unit 20 and the interruption control unit 30 cooperating with the hardware, such as the CPU 80 and the memory 81. The dump control unit 10 may be implemented by a dedicated OS for dump output cooperating with the hardware such as the CPU 80 and the memory 81. The following will describe in detail the dump control unit 10.

A dump output device control table 5 is a nonvolatile storage unit in which priority information, output device identifier, dump target information and dump format information are registered so as to be associated with each other.

The dump target information indicates whether or not data in each element of the information processor is to be dumped. For example, the dump target information may indicate a CPU register or the entire memory to be dumped. A user is allowed to optionally set the dump target information based on the capacity of a dump target device and the performance requirement of the dump process.

The dump format information indicates a file format of dump data. ELF format, binary format, or hexadecimal format may be selected as the dump format information. The user is allowed to optionally set the priority information, the output device identifier, the dump target information, and the dump format information, through a displayed setting screen.

A dump output device control unit 1 controls an output process for each output device based on information stored in the dump output device control table 5 and a state of the free space of the dump output device.

The dump output device control unit 1 determines whether to adopt an output device, dump target information and a dump format that are set by a user, or an output device, dump target information and a dump format that are determined by a dump content determination unit 2.

Depending on a usage situation of the system, a case where an amount of the free space of the device which is a dump output destination is insufficient, or a case where dump output based on contents that are set in the dump output device control table 5 by the user is impossible may occur. In order to solve the problem, when the size of the dump information based on a setting value is larger than the free space of the dump output device, the dump output device control unit 1 adopts a dump target and a dump format that are determined by the dump content determination unit 2.

The dump output device control unit 1 calculates an address to be actually dumped as a dump target, and performs generation of a header and conversion of format corresponding to dump format if necessary.

The dump output device control unit 1 calls the dump content determination unit 2. The dump content determination unit 2 obtains a free space of the dump output device, and determines dump target information and a dump format such that dump information fits into the obtained free space. For example, when only data in the CPU register is outputted as dump information, an amount of data becomes smaller than a case when data stored in the CPU register and the memory is outputted as dump information. In addition, as to dump format, an amount of data in hexadecimal format becomes smaller than an amount of data in ELF format.

The dump content determination unit 2 determines a dump target and a dump format such that dump information fits into the free space of the dump output device but may contain as much data as possible. In the embodiment, ELF format provides a largest amount of data, hexadecimal format comes next, and binary format provides a smallest amount of data.

The dump content determination unit 2 performs an automatic determination process for determining each information when the user does not designate the dump target information and the dump format information within the dump output device control table 5. The automatic determination process will be described in detail later.

A dump output unit 3 outputs dump information to the dump output device determined by the dump output device control unit 1. A manner of outputting the dump information depends on a dump output device. In order to perform an output process suitable for each dump output device, the dump output unit 3 performs an output process for outputting dump information to each output device based on the output device identifier within the dump output device control table 5.

A dump output device monitoring unit 4 monitors whether or not a dump output device is in an abnormal state. For example, when a response from a dump output device is not received for a certain period of time, the dump output device monitoring unit 4 determines that the dump output device is in an abnormal state, and notifies the dump output device control unit 1 of the detection result.

Figure 3A:
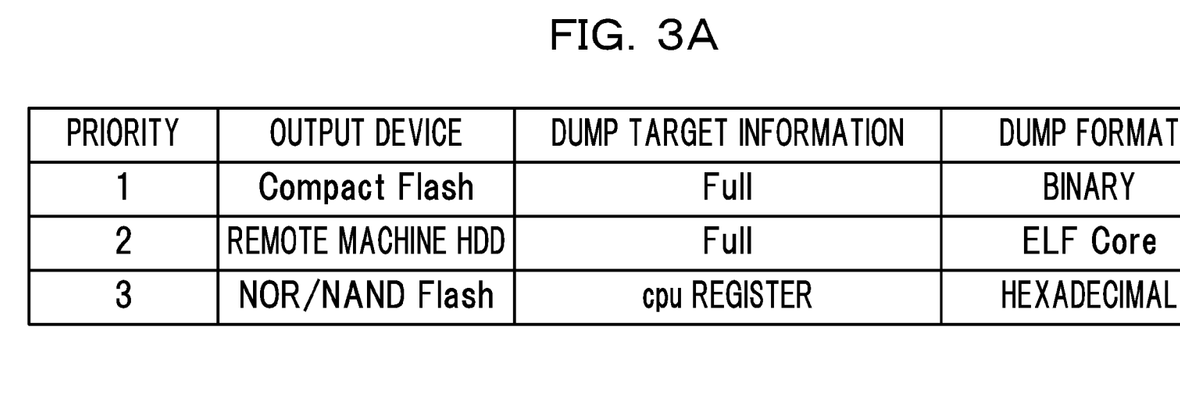
FIGS. 3A and 3B illustrate examples of data stored in a dump output device control table according to the embodiment.
Figure 3B:
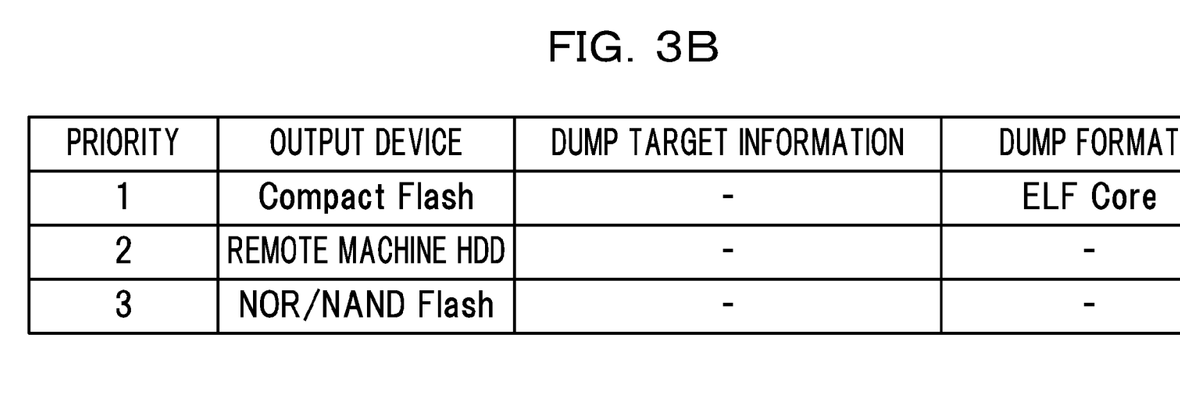

FIGS. 3A and 3B illustrate examples of data stored in the dump output device control table 5. In FIG. 3A and FIG. 3B, the dump output device control table 5 stores entries each having a set of an output device, dump target information and a dump format with priority assigned thereto.

In the example of FIG. 3A, the dump output device control table 5 stores three entries. The first entry contains an output device identifier indicating that an output device is a Compact Flash within the information processor 100, dump target information indicating that all contents in the CPU register and the memory (Full) is a dump target, and dump format information indicating that a dump format is binary format. The second entry contains an output device identifier indicating that an output device is a magnetic disk device (HDD: Hard Disk Drive) of a remote machine outside the information processor 100, dump target information indicating that all contents in the CPU register and the memory (Full) is a dump target, and dump format information indicating that a dump format is ELF format (ELF Core). The third entry contains an output device identifier indicating that an output device is a NOR/NAND flash memory within the information processor 100, dump target information indicating that only contents in the CPU register is a dump target, and dump format information indicating that a dump format is hexadecimal format. The first entry has a highest priority, and the third entry has a smallest priority among three entries.

Setting of these entries to the dump output device control table 5 can be performed by the user. The capacity of each device and a size reserved within each device for dump vary. Thus, the user sets the dump output device control table 5 such that contents to be dumped are suitable for the information processor 100. Further, as a specification of the information processor, the dump process also needs to be completed within a predetermined period of time. Thus, the user sets the dump output device control table 5 such that the dump process can be completed within the predetermined period of time and a maximum required amount of data can be dumped.

FIG. 3B illustrates a dump output device control table when the user does not set dump target information and dump format information. As illustrated in FIG. 3B, when the user does not set dump target information and dump format information into the dump output device control table (in FIG. 3B, values are not set in the fields of "−"), the dump content determination unit 2 obtains a free space state of the dump output device, and determines a dump target and a dump format based on the obtained free space state of the dump output device.

In the example of FIG. 3B, a setting in which a dump is to be performed to a Compact Flash in ELF format is set at priority 1, that is the highest priority. Thus, the dump content determination unit 2 determines whether it is possible to dump all data in the CPU register and the memory in ELF format or not, by comparing the free space of the Compact Flash with the size of dump information to be outputted. When it is determined that dump output to the designated output device is possible, all the data in the CPU register and the memory is dumped to the Compact Flash. On the other hand, when it is determined that the dump output to the designated output device is impossible, only the CPU register becomes dump target information in the embodiment.

When there is no free space in the Compact Flash and it is determined that the dump output is impossible, the dump content determination unit 2 determines dump output to be performed to the remote machine HDD with the next priority. In this case, similarly as in the case of the Compact Flash, the dump content determination unit 2 determines whether or not the dump to the remote machine HDD is possible. When it is determined that the dump to the remote machine HDD is impossible, the dump content determination unit 2 determines whether a dump to an output device with the next priority is possible or not.

Figure 4:
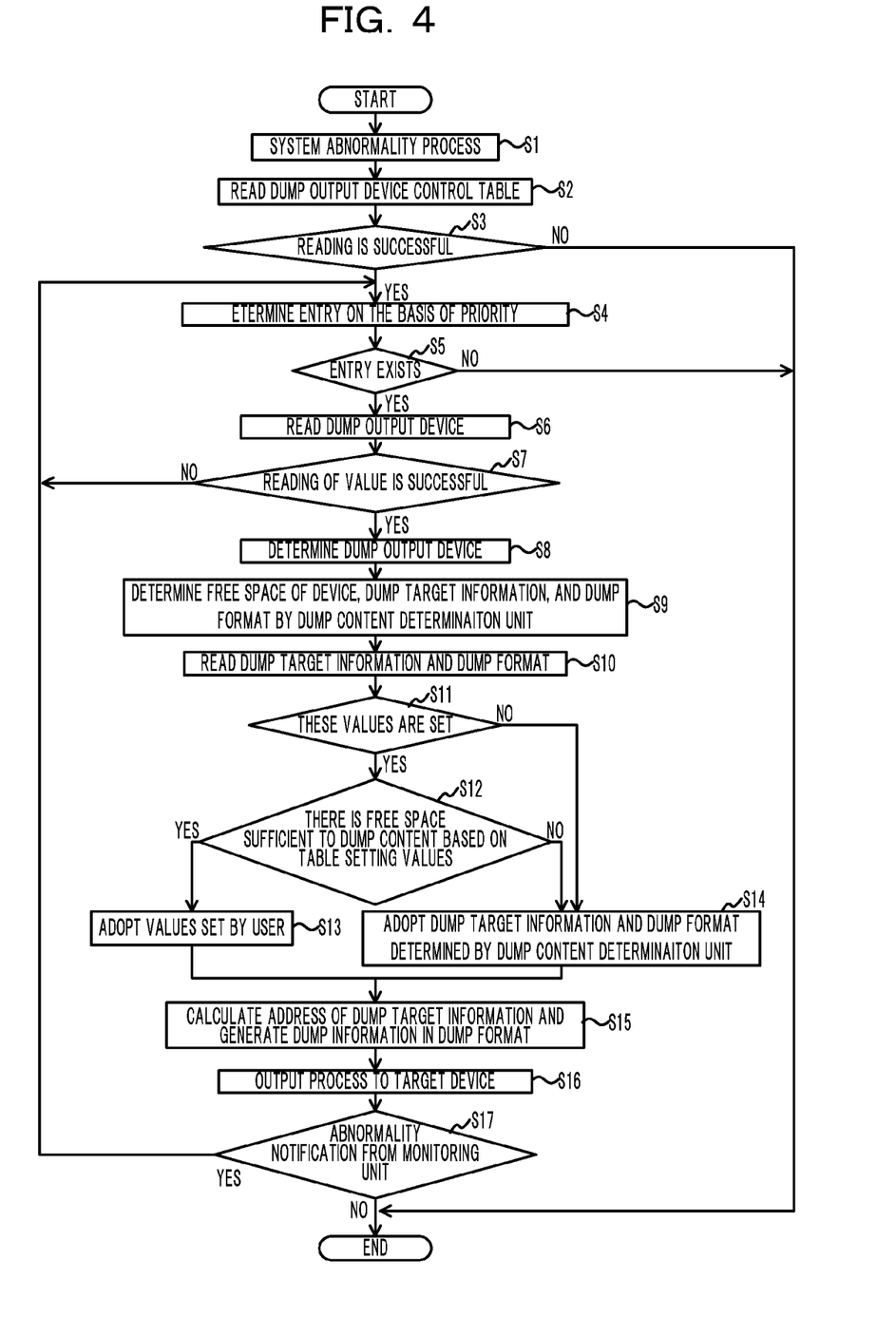
FIG. 4 is a flow chart showing an example of an operation of a dump control unit according to the embodiment.

An operation of the dump control unit 10 will be described with reference to a flow chart in FIG. 4 illustrating an example of the operation of the dump control unit 10.

When detecting an abnormality of the hardware or the software within the information processor 100, the system abnormality handling unit 40 instructs the dump control unit 10 to perform an abnormality process (S1). The dump output device control unit 1 in the dump control unit 10 reads data in the dump output device control table 5 which is set by the user in advance (S2). When reading of the data in the dump output device control table 5 fails (No at S3), the processing in FIG. 4 ends.

On the other hand, when the data in the dump output device control table 5 is read successfully (Yes at S3), the dump output device control unit 1 determines the entry in the dump output device control table 5 with the highest priority (S4). When there is no entry in the dump output device control table 5 (No at S5), the processing in FIG. 4 ends. On the other hand, when there is any entry in the dump output device control table 5 (Yes at S5), the dump output device control unit 1 reads the value of the output device identifier in the entry with the highest priority (S6).

When reading of the output device identifier fails due to a reason such as the value of the output device identifier not having been set (No at S7), the dump output device control unit 1 returns to the process at S4 for determining the entry with the second highest priority. On the other hand, when the value of the output device identifier is read successfully (Yes at S7), the dump output device control unit 1 determines a device defined by the successfully-read output device identifier, as a device set by the user (S8).

The dump content determination unit 2 obtains the free space of the device determined at S8, and calculates dump target information and a dump format such that dump information fits into the obtained free space of the device (S9).

Next, the dump output device control unit 1 reads dump target information and dump format information in the entry on which the processing is currently performed (S10), and determines whether or not these values are set in the entry (S11). When the values of the dump target information and the dump format information are set in the entry (Yes at S11), the dump output device control unit 1 determines whether or not the device determined at S8 has a sufficient free space for outputting with contents of the dump target information and the dump format information that are read at S10 (S12). The free space of the output device is already obtained at S9.

When the output device has a sufficient free space (Yes at S12), the dump output device control unit 1 adopts the dump target information and the dump format information set by the user that are read at S10 (S13). On the other hand, when the output device does not have a sufficient free space (No at S12), the dump output device control unit 1 adopts dump target information and a dump format that are determined by the dump content determination unit 2 (S14). When it is determined at S11 that the dump target information and the dump format are not set (No at S11), the dump output device control unit 1 adopts the dump target information and the dump format that are determined by the dump content determination unit 2 (S14).

The dump output device control unit 1 calculates an address of the adopted dump target information, and generates dump information in the adopted dump format (S15). The dump output unit 3 outputs the generated dump information to the target device (S16).

When an abnormality of the output target device is detected during the dump output process (Yes at S17), the dump output device monitoring unit 4 returns the processing to S4, and then the entry with the next higher priority is determined (S4). On the other hand, when the output target device is not abnormal as a result of the determination at S17 (No at S17), the processing in FIG. 4 ends.

According to the embodiment, the dump process can be performed on a device that is optionally set, or designated, by the user. In addition, a dump process independent of an execution environment is possible.

The dump control unit 10 in the embodiment can be provided as a dump output control apparatus having hardware such as a CPU and a memory.

Figure 5:
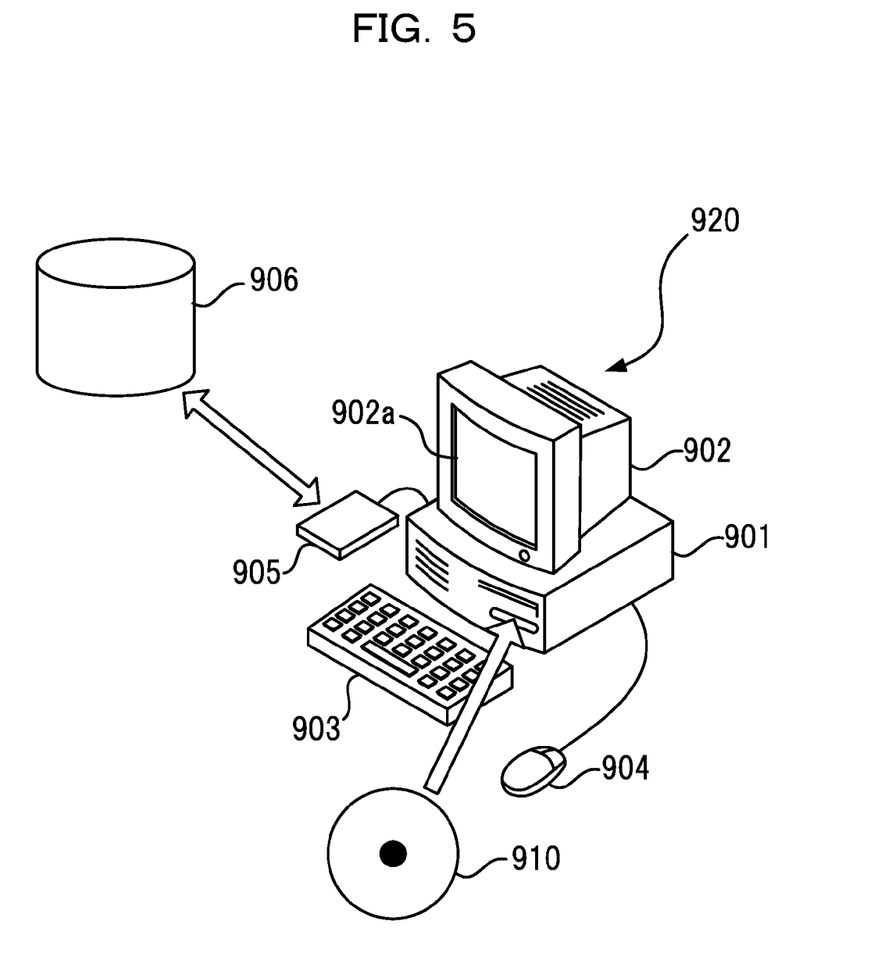
FIG. 5 illustrates an example of a hardware configuration of a computer system that is applicable to a dump output control apparatus according to the embodiment.

FIG. 5 illustrates an example of a computer system to which the embodiment is applicable. As illustrated in FIG. 5, a computer system 920 includes a main unit 901 having a CPU, a disk drive, and the like, a display 902 that displays an image in accordance with an instruction from the main unit 901, a keyboard 903 for inputting various information to the computer system 920, a mouse 904 that designates any position on a display screen 902a of the display 902, and a communication device 905 that accesses an external database and the like and downloads a program and the like stored in another computer system. The communication device 905 may be a network communication card or a modem.

A program for performing each of the above processes in the computer system that composes the dump output control apparatus as described above can be provided as a delay test program. The computer system composing the dump output control apparatus may execute this program, by storing the program in a recording medium readable by the computer system. The program for performing each of the above processes can be stored in a portable recording medium such as a disk 910. On the other hand, this program can be downloaded from a recording medium 906 of another computer system by the communication device 905.

A dump output control program (or dump output control software) that causes the computer system 920 to have at least a dump output control function is inputted to the computer system 920 and then compiled. This program causes the computer system 920 to operate as a dump output control apparatus having a dump output control function.

In addition, this program may be stored in a recording medium readable by a computer, such as the disk 910. Recording media readable by the computer system 920 may include internal storage units mounted in a computer, such as a ROM and a RAM; portable storage media such as the disk 910, a flexible disk, a DVD disk, a magneto-optical disk, and an IC card; storage unit or device forming a database that holds a computer program; various recording media provided in another computer system and a recording medium forming their database; and various recording media that are accessible by a computer system connected via a communication means such as the communication device 905. These media are non-transitory media.

Figure 6:
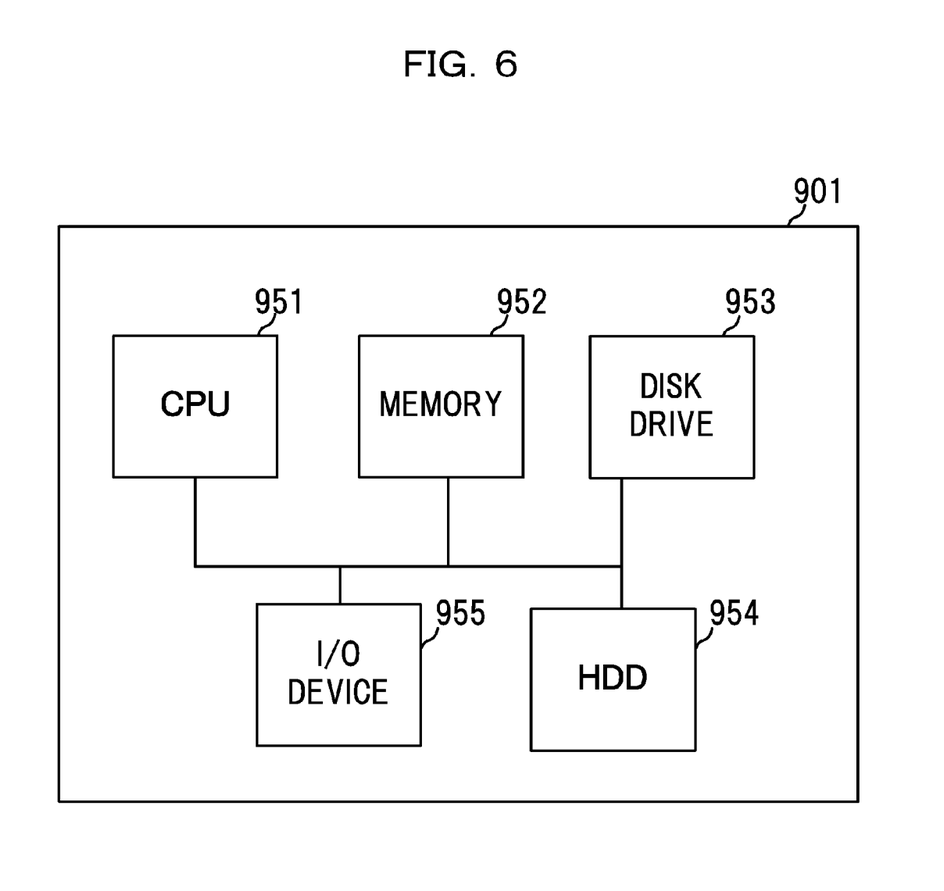
FIG. 6 illustrates an example of a hardware configuration of a main unit of the computer system that is applicable to the dump output control apparatus according to the embodiment.

FIG. 6 illustrates an example of a hardware configuration of the main unit 901 of the computer system 920. The main unit 901 includes a CPU 951 (corresponding to the CPU 80 in FIG. 1), a memory 952 (corresponding to the memory 81 in FIG. 1), a disk drive 953 that performs reading or writing of data on a portable recording medium such as the disk 910, and an HDD 954 (corresponding to the dump output device 82 in FIG. 1) that is a nonvolatile storage device. the main unit 901 further has an I/O device 955 (corresponding to the network device 83 in FIG. 1) that controls communication with the external device.

Each of the aforementioned functional units is implemented by a program stored in advance in a nonvolatile storage device such as the HDD 954 and the disk 910, cooperating with hardware resources such as the CPU 951 and the memory 952. In addition, the aforementioned data can be stored in the HDD 954 or the memory 952.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A dump output control apparatus, comprising:
    a storage unit that stores output device information indicating one or more output devices that are output destinations of dump information;
    an input unit configured to receive a dump target, which includes one or more of the one or more output devices, and a dump format for the dump information from a user;
    a dump output device control unit that obtains the output device information stored in the storage unit and determines one or more devices as output devices for outputting the dump information thereto based on the obtained output device information;
    a dump content determination unit that determines whether there is sufficient free space in the determined one or more output devices for the dump information and determines a dump target, which includes one or more of the one or more output devices, and a dump format such that the dump information fits into the free space; and
    a dump output unit that outputs the dump information to the determined one or more output devices, wherein
    when the dump content determination unit determines that there is sufficient free space in the one or more output devices for the dump information, the dump output unit outputs the dump information according to the dump target and the dump format received from the user, and
    when the dump content determination unit determines that there is not sufficient free space in the one or more output devices for the dump information or when no dump target and dump format is received by the user, the dump output unit outputs the dump information according to the dump target and the dump format determined by the dump content determination unit.

2. The dump output control apparatus according to claim 1, wherein
    the dump output device control unit calculates a size of data to be dumped, and
    the dump output device control unit determines a device as a dump output destination device when a free space of the device for which output device information is defined in the storage unit is larger than the calculated size of the data.

3. The dump output control apparatus according to claim 1, wherein
    the storage unit stores priority information indicating a priority of an output destination device, for each of the plurality of output device information, when the storage unit stores a plurality of pieces of output device information, and
    the dump output device control unit obtains the output device information stored in the storage unit in order of priority defined by the priority information, and determines a dump output destination device based on the output device information.

4. The dump output control apparatus according to claim 3, further comprising:
    a dump output device monitoring unit that monitors whether or not a dump output destination device is in an abnormal state, wherein
    when the dump output device monitoring unit determines that the dump output destination device is in an abnormal state, the dump output device control unit obtains output device information with a next higher priority from the storage unit, and determines a dump output destination device on the basis of the output device information.

5. A non-transitory computer-readable storage medium that stores a dump output control program, the dump output control program causing a computer to perform:
    obtaining output device information stored in a storage unit, which is information concerning one or more output devices that are to be output destinations of dump information;
    optionally receiving a dump target, which includes one or more of the one or more output devices, and a dump format for the dump information from a user;
    determining one or more output devices that are to be the output destination of the dump information based on the output device information;
    determining whether there is sufficient free space in the determined one or more output devices for the dump information and determines a dump target, which includes one or more of the one or more output devices, and a dump format such that the dump information fits into the free space; and
    outputting dump information to the one or more determined devices wherein
    when the determining determines that there is sufficient free space in the one or more output devices for the dump information, the dump output unit outputs the dump information according to the dump target and the dump format received from the user, and
    when the determining determines that there is not sufficient free space in the one or more output devices for the dump information or when no dump target and dump format is received by the user, the dump output unit outputs the dump information according to the determined dump target and the determined dump format.

6. The non-transitory computer-readable storage medium according to claim 5, wherein the dump output control program further causes the computer to perform:
  calculating a size of data to be dumped; and
  determining a device that is a dump output destination device when an amount of a free space of the device for which output device information is defined in the storage unit is larger than the calculated size of the data.

7. A dump output control method, comprising:
  obtaining output device information that is stored in a storage unit, which is information concerning one or more output devices that are to be output destinations of dump information;
  optionally receiving a dump target, which includes one or more of the one or more output devices, and a dump format for the dump information from a user;
  determining one or more output devices that are to be the output destination of the dump information based on the output device information;
  determining whether there is sufficient free space in the determined one or more output devices for the dump information and determines a dump target, which includes one or more of the one or more output devices, and a dump format such that the dump information fits into the free space; and
  outputting dump information to the one or more determined devices, wherein
  when the determining determines that there is sufficient free space in the one or more output devices for the dump information, the dump output unit outputs the dump information according to the dump target and the dump format received from the user, and
  when the determining determines that there is not sufficient free space in the one or more output devices for the dump information or when no dump target and dump format is received by the user, the dump output unit outputs the dump information according to the determined dump target and the determined dump format.

8. The dump output control method according to claim 7, wherein when a plurality of output device information are stored in the storage unit:
  obtaining the output device information stored in the storage unit in an order defined by priority information indicating a priority of corresponding output device information when determining a dump destination device; and
  determining a dump output destination device based on the output device information.

9. The dump output control method according to claim 8, further comprising:
  monitoring whether or not an output destination device is in an abnormal state; and
  obtaining an output device information having a priority next to an output destination device if it is determined that the output destination device is in an abnormal state, when determining a device dump information is dumped out thereto.

* * * * *

UNITED STATES PATENT AND TRADEMARK OFFICE
CERTIFICATE OF CORRECTION

PATENT NO. : 8,245,085 B2
APPLICATION NO. : 12/785743
DATED : August 14, 2012
INVENTOR(S) : Takuma Ueba It is certified that error appears in the above-identified patent and that said Letters Patent is hereby corrected as shown below:

Column 8, Line 58, In Claim 5, delete "devices" and insert -- devices, --, therefor.

Signed and Sealed this
Twenty-seventh Day of November, 2012

David J. Kappos
*Director of the United States Patent and Trademark Office*